United States Patent [19]

Inui et al.

[11] Patent Number: 4,901,590
[45] Date of Patent: Feb. 20, 1990

[54] MANUAL TRANSMISSION FOR MOTOR VEHICLE

[75] Inventors: Masaki Inui; Masakazu Ishikawa, both of Toyota, Japan

[73] Assignee: Toyota Jidosha Kabushiki Kaisha, Aichi, Japan

[21] Appl. No.: 234,624

[22] Filed: Aug. 22, 1988

[30] Foreign Application Priority Data

| Aug. 21, 1987 | [JP] | Japan | 62-208821 |
| Sep. 17, 1987 | [JP] | Japan | 62-141881[U] |
| Sep. 17, 1987 | [JP] | Japan | 141882[U] |
| Sep. 21, 1987 | [JP] | Japan | 144127[U] |
| Sep. 21, 1987 | [JP] | Japan | 62-144128[U] |

[51] Int. Cl.$^4$ .............................................. F16H 3/08
[52] U.S. Cl. .................................. 74/331; 74/333; 74/359
[58] Field of Search ................. 74/331, 333, 357–360

[56] References Cited

U.S. PATENT DOCUMENTS

| 2,825,232 | 3/1958 | Sieving et al. | 74/333 X |
| 3,318,167 | 5/1967 | Frost | 74/331 |
| 3,802,293 | 4/1974 | Winckler et al. | 74/331 X |
| 4,226,135 | 10/1980 | Winter | 74/360 X |
| 4,458,551 | 7/1984 | Winter-Peter | 74/447 |

FOREIGN PATENT DOCUMENTS

| 0088188 | 9/1983 | European Pat. Off. | 74/331 |
| 468647 | 3/1971 | Japan. | |
| 58-44551 | 9/1981 | Japan. | |
| 58-149441 | 9/1983 | Japan. | |
| 599778 | 3/1984 | Japan. | |
| 61-194846 | 12/1986 | Japan. | |
| 8505665 | 12/1985 | PCT Int'l Appl. | 74/331 |

*Primary Examiner*—Dwight G. Diehl
*Attorney, Agent, or Firm*—Oliff & Berridge

[57] ABSTRACT

A manual transmission includes an input shaft having first and second drive gears fixed thereon, an output shaft arranged in parallel with the input shaft having at least a pair of change-speed driven gears fixed thereon, a first countershaft arranged in parallel with the input and output shafts at one side thereof and having a first driven gear fixed thereon and engaged with the first drive gear, a pair of low speed drive gears rotatable thereon and engaged with the change-speed driven gears, and a first synchronizer coupling adapted to selectively connect the low speed drive gears to the first countershaft, and a second countershaft arranged in parallel with the input and output shafts at the other side thereof and having a second driven gear fixed thereon and engaged with the second drive gear, a pair of high speed drive gears rotatable thereon and engaged with the change-speed driven gears, and a second synchronizer coupling adapted to selectively connect the high speed drive gears to the second countershaft, wherein an additional change-speed driven gear is fixed on one end of the output shaft and engaged with an additional high speed drive gear rotatable on one end of the second countershaft and connectable thereto.

9 Claims, 15 Drawing Sheets

MANUAL TRANSMISSION FOR MOTOR VEHICLE

BACKGROUND OF THE INVENTION

1. Field of the Invention

The present invention relates to a manual transmission for motor vehicles, and more particularly to a variable speed manual transmission of the type which includes four axes upon which the drive elements are mounted.

2. Description of the Prior Art

U.S. Pat. No. 4,458,551 issued on July 10, 1984 discloses a variable speed manual transmission which includes an input shaft having a drive pinion fixed thereon, an output shaft coaxial with the input shaft and having a first synchronizer coupling adapted to selectively connect the input shaft to the output shaft and first, second, third, fourth and fifth pinions, a first intermediate shaft having first and second gears fixed thereon and located on opposite axial ends of the first synchronizer coupling, a second synchronizer coupling mounted thereon, and third and fourth gears selectively connectable to the first intermediate shaft by the second synchronizer coupling, and a second intermediate shaft having a fifth gear fixed thereon, a third synchronizer coupling mounted thereon, and sixth and seventh gears selectively connectable to the second intermediate shaft by the third synchronizer coupling. The third, fourth and fifth pinions are continuously engaged with the third, fourth and sixth gears, respectively, the first pinion is continuously engaged with the second gear, and the first and fifth gears are continuously engaged with the drive pinion. In such an arrangement, the axial length of the transmission may not be shortened due to coaxial arrangement of the input and output shafts, and the output shaft is located at the same height as the input shaft. For these reasons, it is difficult to manufacture the manual transmission in a compact construction, and it is also difficult to mount the manual transmission on a desired portion of a motor vehicle.

SUMMARY OF THE INVENTION

It is, therefore, a primary object of the present invention to provide an improved manual transmission the output shaft of which is located under the input shaft and in parallel therewith to shorten the axial length of the transmission and to facilitate the mounting of the transmission on a motor vehicle.

According to the present invention, the primary object is attained by providing a manual transmission which includes a housing, an input shaft rotatably mounted within the housing and having a first drive gear of small diameter for low speed drive and a second drive gear of large diameter for high speed drive fixed thereon, an output shaft rotatably mounted within the housing in parallel with the input shaft and having at least a pair of axially spaced change-speed driven gears mounted thereon, a first countershaft rotatably mounted within the housing and arranged in parallel with the input and output shafts at one side thereof, the first countershaft having a first driven gear fixed thereon and continuously engaged with the first drive gear on the input shaft, a pair of axially spaced low speed drive gears rotatably mounted thereon and continuously engaged with the change-speed driven gears on the output shaft, and a first synchronizer coupling provided thereon to selectively connect the low speed drive gears to the first countershaft, and a second countershaft rotatably mounted within the housing and arranged in parallel with the input and output shafts at the other side thereof, the second countershaft having a second driven gear fixed thereon and continuously engaged with the second drive gear on the input shaft, a pair of axially spaced high speed drive gears rotatably mounted thereon and continuously engaged with the change-speed driven gears on the output shaft, and a second synchronizer coupling provided thereon to selectively connect the high speed drive gears to the second countershaft.

The manual transmission is characterized in that all the drive and driven gears on the input and output shafts and all the driven and drive gears on the countershafts are contained in the housing and that an additional change-speed driven gear is fixed on one end of the output shaft extending into a second housing fastened to one end of the housing, an additional high speed drive gear is rotatably mounted on one end of the second countershaft extending into the second housing and continuously engaged with the additional change-speed driven gear, and a third synchronizer coupling is provided on the one end of the second countershaft to selectively connect the additional high speed drive gear to the second countershaft.

BRIEF DESCRIPTION OF THE DRAWINGS

Other objects, features and advantages of the present invention will be more readily appreciated from the following detailed description of preferred embodiments thereof when considered with reference to the accompanying drawings, in which.

DESCRIPTION OF THE PREFERRED EMBODIMENTS

Figure 1:
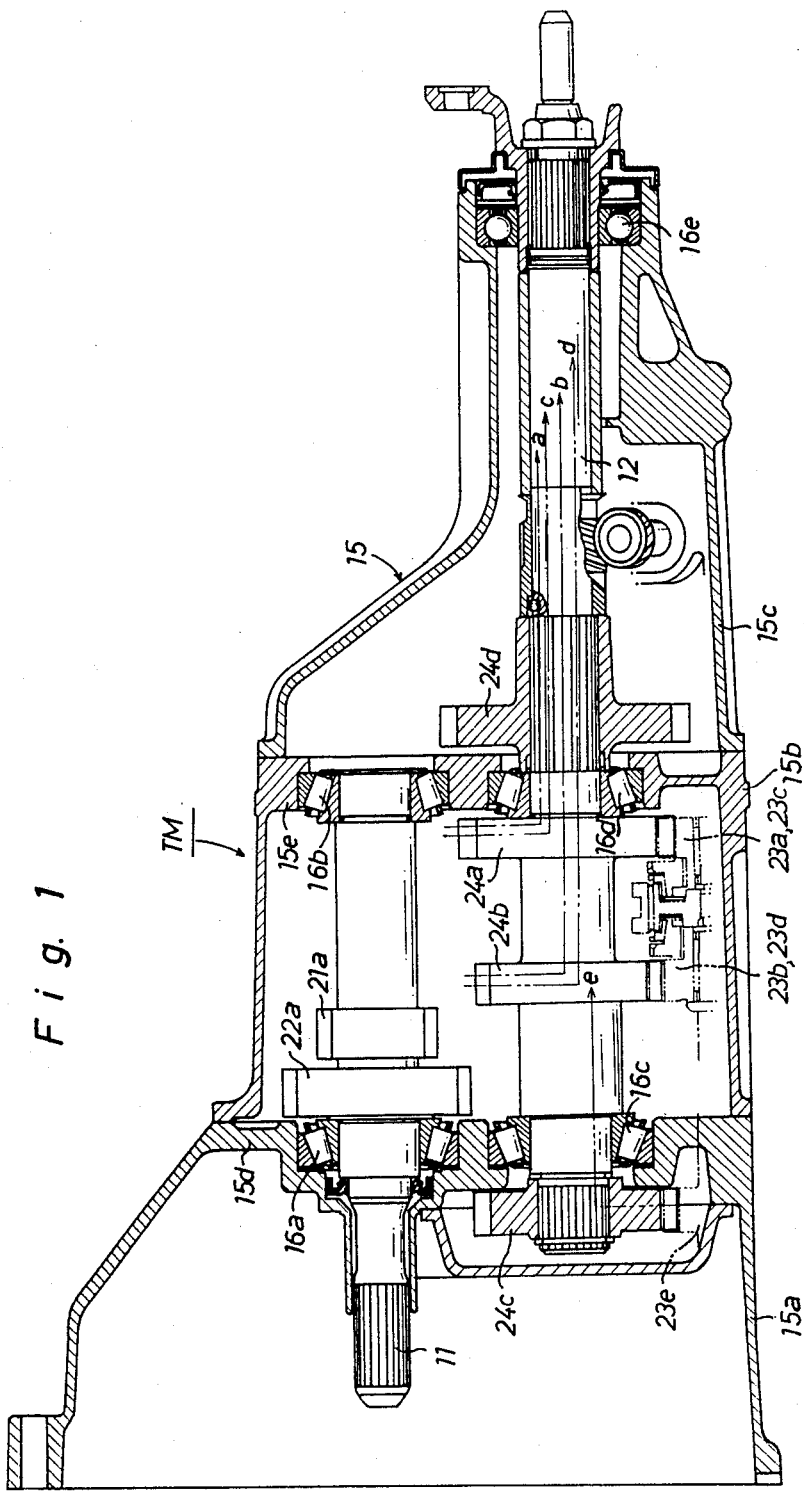
FIG. 1 is a sectioned side view of a variable speed manual transmission according to the present invention, being taken at plane I—I in FIG. 3.
Figure 2:
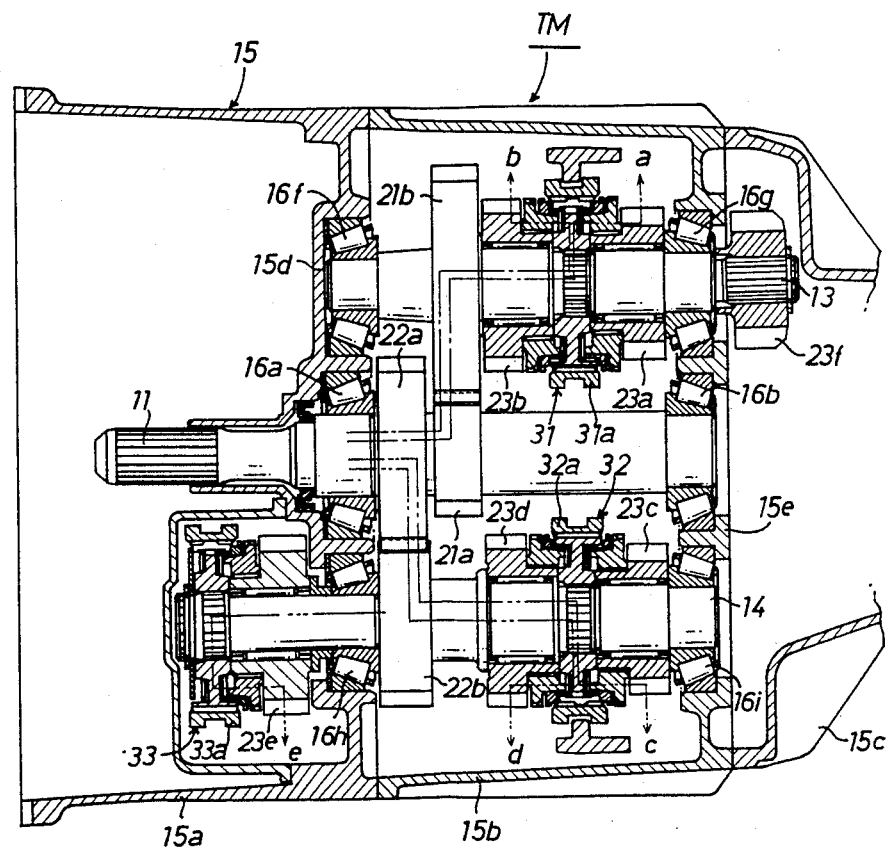
FIG. 2 is a sectioned plan view of the manual transmission taken at plane II—II in FIG. 3.
Figure 3:
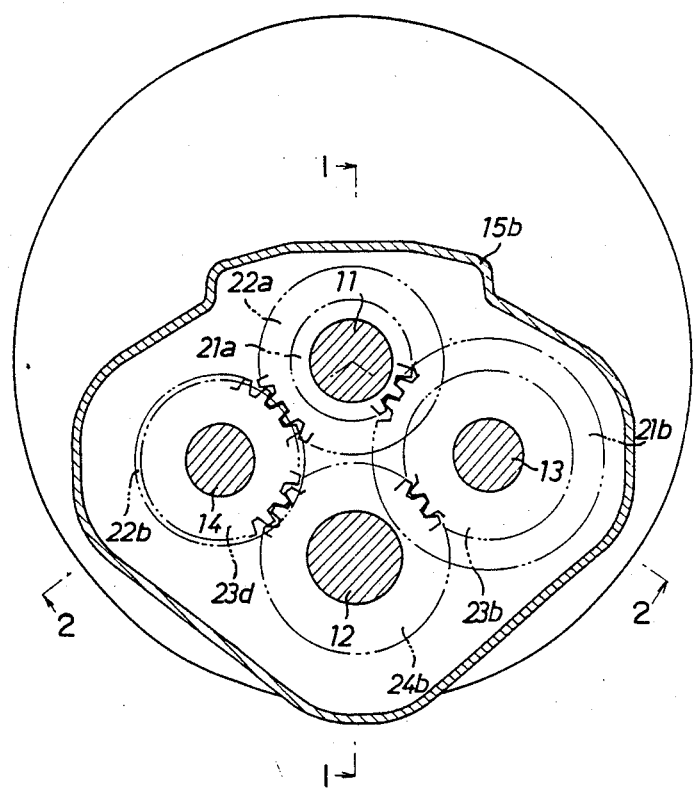
FIG. 3 is a cross-sectional view schematically illustrating an arrangement of four axes in the manual transmission.

As is illustrated in FIGS. 1-3 of the drawings, a variable speed manual transmission TM according to the present invention has an input shaft 11, an output shaft 12 and two parallel countershafts 13, 14 rotatably mounted within a housing assembly 15 including a clutch housing part 15a, a transmission housing part 15b and an extension housing part 15c fastened together to be mounted as a unit on a motor vehicle of the front-engine rear-wheel drive type. The input shaft 11 is rotatably supported by a pair of axially spaced tapered roller gearings 16a and 16b respectively carried on upright rear end walls 15d and 15e of housing parts 15a and 15b. The output shaft 12 is located under the input shaft 11 and in parallel therewith and is rotatably supported by a pair of axially spaced tapered roller bearings 16c and 16d respectively carried on the upright rear end walls 15d and 15e. The output shaft 12 extends outwardly through the extension housing part 15c and is further supported by a ball bearing 16e carried on the rear end of housing part 15c.

As shown in FIG. 2, the countershafts 13 and 14 are arranged in parallel with the input and output shafts 11 and 12 at opposite sides thereof and are each located between the input and output shafts 11 and 12 in a vertical plane. The first countershaft 13 is rotatably supported by a pair of axially spaced tapered roller bearings 16f and 16g carried on the upright rear end walls 15d and 15e of housing parts 15a and 15b. The first countershaft 13 has a rear end extending into the interior of extension housing part 15c. Similarly, the second countershaft 14 is rotatably supported by a pair of axially spaced tapered roller bearings 16h and 16i carried on the upright rear end walls 15d and 15e of housing parts 15a and 15b. The second countershaft 14 has a front end portion extending into the interior of clutch housing part 15a.

The input shaft 11 has a first drive gear 21a of small diameter for low speed drive and a second drive gear 22a of large diameter for high speed drive fixedly mounted thereon. The first drive gear 21a is continuously in meshing engagement with a first driven gear 21b of large diameter integrally provided on the first countershaft 13, while the second drive gear 22a is continuously in meshing engagement with a second driven gear 22b of small diameter integrally provided on the second countershaft 14. The first countershaft 13 has first and second forward drive gears 23a and 23b rotatably mounted thereon and a first synchronizer coupling 31 mounted thereon between the first and second forward drive gears 23a and 23b. When a clutch sleeve 31a of coupling 31 is retained in a neutral position, the first and second forward drive gears 23a and 23b are conditioned to freely rotate on the first countershaft 13. The clutch sleeve 31a of coupling 31 is axially moved rearwards or forwards to selectively connect the first and second forward drive gears 23a and 23b to the first countershaft 13 for rotation therewith.

Similarly, the second countershaft 14 has third and fourth forward drive gears 23c and 23d rotatably mounted thereon and a second synchronizer coupling 32 mounted thereon between the third and fourth forward drive gears 23c and 23d. When a clutch sleeve 32a of coupling 32 is retained in a neutral position, the third and fourth forward drive gears 23c and 23d are conditioned to freely rotate on the second countershaft 14. The clutch sleeve 32a of coupling 32 is axially moved rearwards or forwards to selectively connect the third and fourth forward drive gears 23c and 23d to the second countershaft 14 for rotation therewith.

In this embodiment, the first countershaft 13 has a reverse drive gear 23f fixedly mounted on the rear end thereof, while the second countershaft 14 has a fifth forward drive gear 23e rotatably mounted on the front end portion thereof and a third synchronizer coupling 33 provided thereon to selectively connect the fifth forward drive gear 23e to the second countershaft 14. The reverse drive gear 23f is located in the extension housing part 15c, while the fifth forward drive gear 23e and third synchronizer coupling 33 are located in the clutch housing part 15a. When a clutch sleeve 33a of coupling 33 is retained in a neutral position, the fifth forward drive gear 23e is conditioned to freely rotate on the second countershaft 14. The clutch sleeve 33a of coupling 33 is axially moved rearwards to selectively connect the fifth forward drive gear 23e to the second countershaft 14 for rotation therewith.

As shown in FIG. 1, the output shaft 12 is integrally provided thereon with a first driven gear 24a of large diameter for the first and third speed ratios and a second driven gear 24b of small diameter for the second and fourth speed ratios. As shown by imaginary lines in the figure, the first driven gear 24a is continuously in meshing engagement with both the first and third forward drive gears 23a and 23c, while the second driven gear 24b is continuously in meshing engagement with both the second and fourth forward drive gears 23b and 23d. The output shaft 12 has a third driven gear 24c for the fifth speed ratio fixedly mounted on a front end thereof and located in the clutch housing part 15a and has a reverse driven gear 24d fixedly mounted thereon and located in the extension housing part 15c. The third driven gear 24c is continuously in meshing engagement with the fifth forward drive gear 23e on second countershaft 14, while the reverse driven gear 24d is arranged to be brought into drive connection with the reverse drive gear 23f through an axially shiftable idler gear (not shown). In addition, the input shaft 11 of manual transmission TM is arranged to be drivingly connected to a crankshaft of a prime mover of the vehicle through a clutch mechanism (not shown), while the output shaft 12 is arranged to be drivingly connected to a rear propeller shaft (not shown).

In operation, the power applied to input shaft 11 is transmitted to the first countershaft 13 through drive and driven gears 21a, 21b and to the second countershaft 14 through drive and driven gears 22a and 22b. When the first synchronizer coupling 31 is moved rearwards to connect the first forward drive gear 23a to the first countershaft 13, the power is transmitted to the output shaft 12 through the first driven gear 24a as shown by a dash and dotted line a in FIGS. 1 and 2. When the first synchronizer coupling 31 is moved forwards to connect the second forward drive gear 23b to the first countershaft 13, the power is transmitted to the output shaft 12 through the second driven gear 24b as shown by a dash and dotted line b in FIGS. 1 and 2. When the second synchronizer coupling 32 is moved rearwards to connect the third forward drive gear 23c to the second countershaft 14, the power is transmitted to the output shaft 12 through the first driven gear 24a as shown by a dash and two-dotted line c in FIGS. 1 and 2. When the second synchronizer coupling 32 is moved forwards to connect the fourth forward drive gear 23d to the second countershaft 14, the power is transmitted to the output shaft 12 through the second driven gear 24b as shown by a dash and two-dotted line d in FIGS. 1 and 2. When the third synchronizer coupling 33 is moved rearwards to connect the fifth forward drive gear 23e to the second countershaft 14, the power is transmitted to the output shaft 12 through the third driven gear 24c as shown by a dash and three-dotted line e in FIGS. 1 and 2. In such a manner as described above, the power is transmitted to the output shaft 1 selectively at the five forward speed ratios.

In the manual transmission TM, it is to be noted that the output shaft 12 is located under the input shaft 11 and in parallel therewith and arranged also in parallel with the countershafts 13 and 14. With such an arrangement of the four shafts, the axial length of the manual transmission TM can be shortened to provide the manual transmission in a compact construction. Since the distance between the axially spaced bearings is shortened, thermal influence to each preload of the bearings can be reduced. Furthermore, the rear propeller shaft for connection to the output shaft 12 can be arranged in a lower position than the input shaft 11 to facilitate the mounting of the manual transmission on the vehicle.

The manual transmission TM is further characterized in that the fifth forward drive gear 23e and third driven gear 24c are located in the clutch housing part 15a and that the reverse drive and driven gears 23f and 24d are located in the extension housing part 15c. With such an arrangement, dead spaces in housing parts 15a and 15c are utilized to contain the gears 23e, 24c 23f, 24d and third synchronizer coupling 33 therein. This is useful to shorten the distance between the axially spaced bearings for the four shafts 11, 12, 13 and 14.

Figure 4:
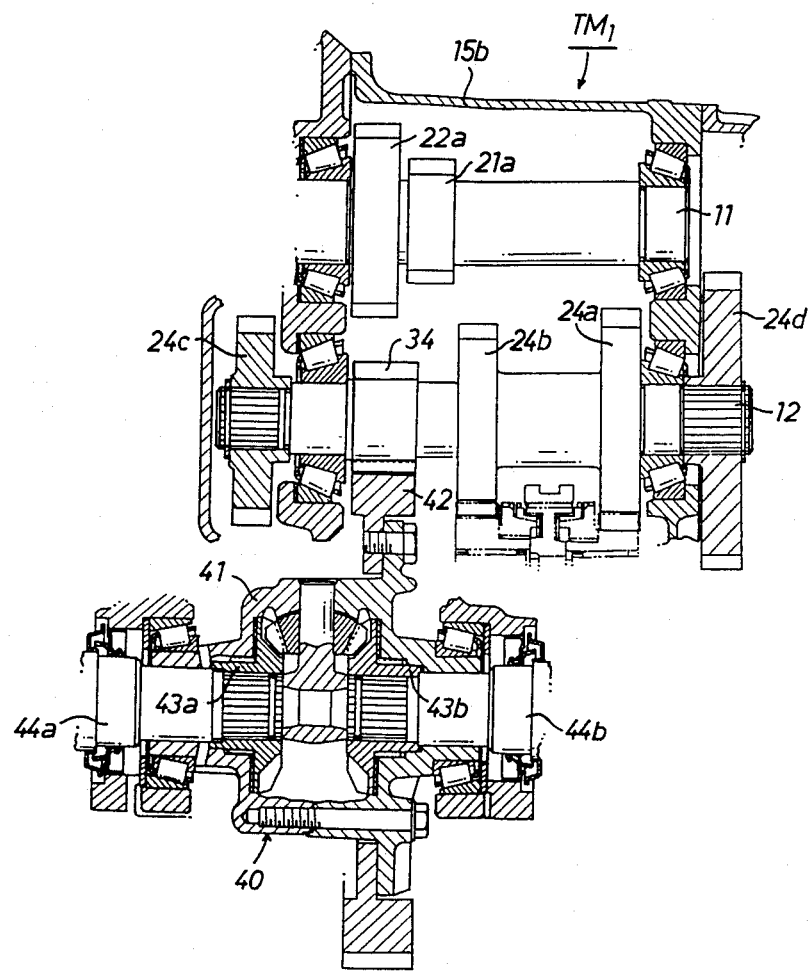
FIG. 4, is a sectioned side view of a first modification of the manual transmission which corresponds with the illustration of FIG. 1.
Figure 5:
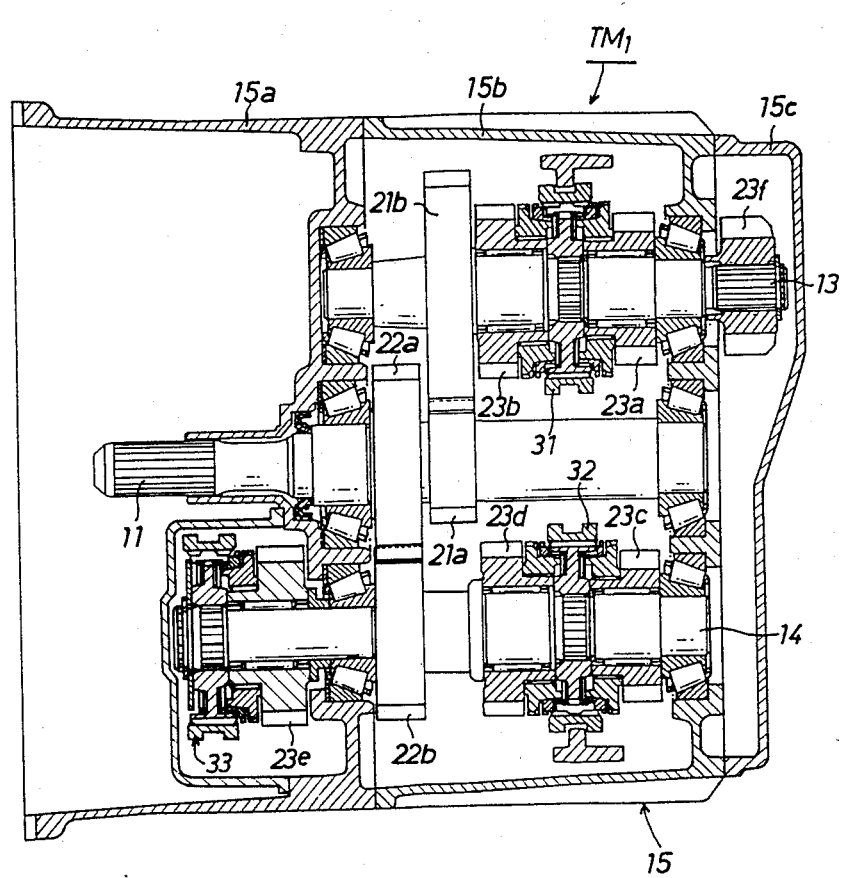
FIG. 5 is a sectioned plan view of the first modification which corresponds with the illustration of FIG. 2.

In FIGS. 4 and 5 there is illustrated a first modification of the manual transmission TM which is arranged to be mounted on a motor vehicle of the front-engine front-wheel drive type. In the modified transmission TM₁, as shown in FIG. 4, the output shaft 12 is in the form of a short shaft having an output gear 34 integrally provided thereon and continuously in meshing engagement with a ring gear 42 which is fixedly mounted on a differential case 41 in a front differential 40. Thus, the power applied to output shaft 12 is transmitted to the differential case 41 through the output and ring gears 34 and 42 and distributed to a pair of side shafts 44a and 44b through a pair of side gears 43a and 43b to drive a pair of front road wheels (not shown). The other construction and component parts are substantially the same as those in the manual transmission TM shown in FIGS. 1-3.

Figure 6:
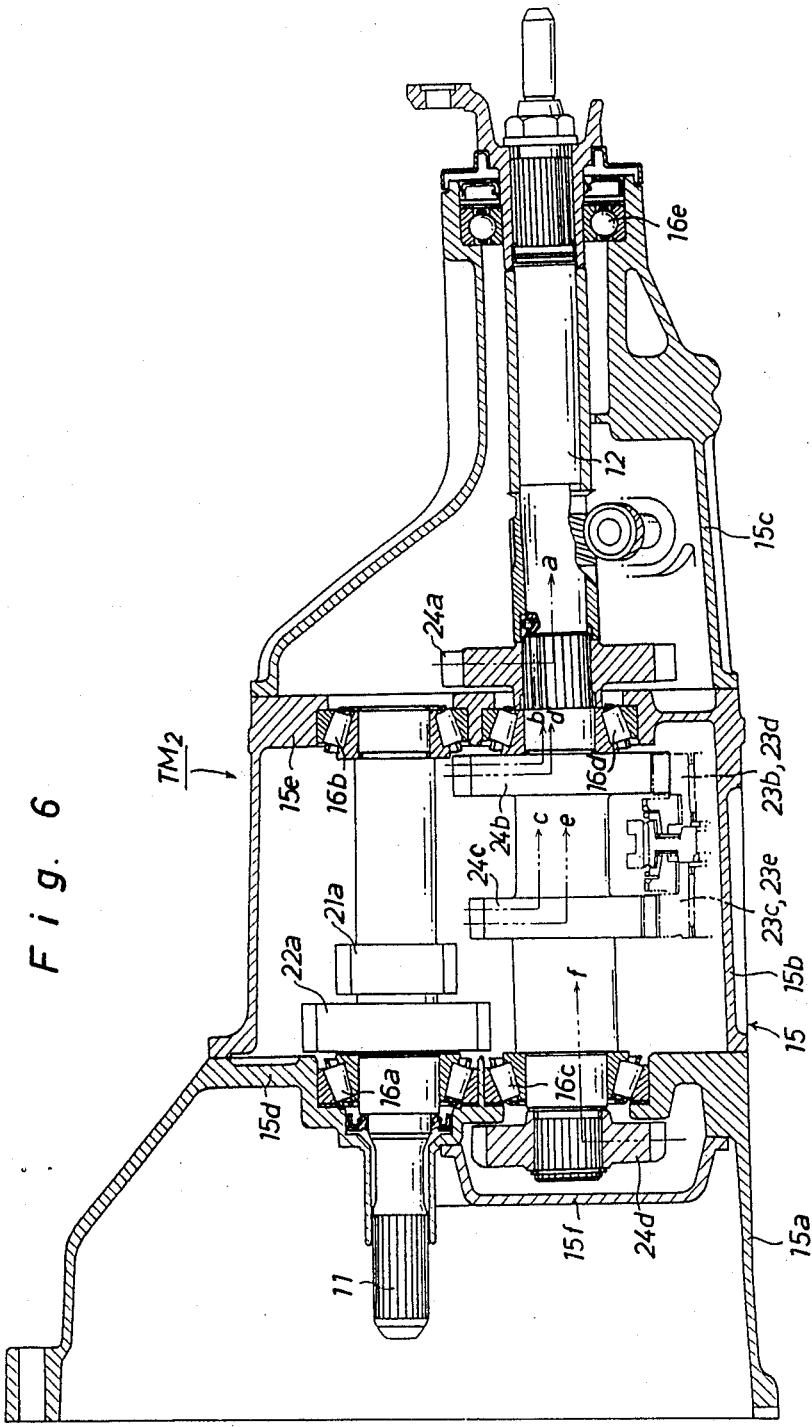
FIG. 6 is a sectioned side view of a second modification of the manual transmission which is taken at plane VI—VI in FIG. 8.
Figure 7:
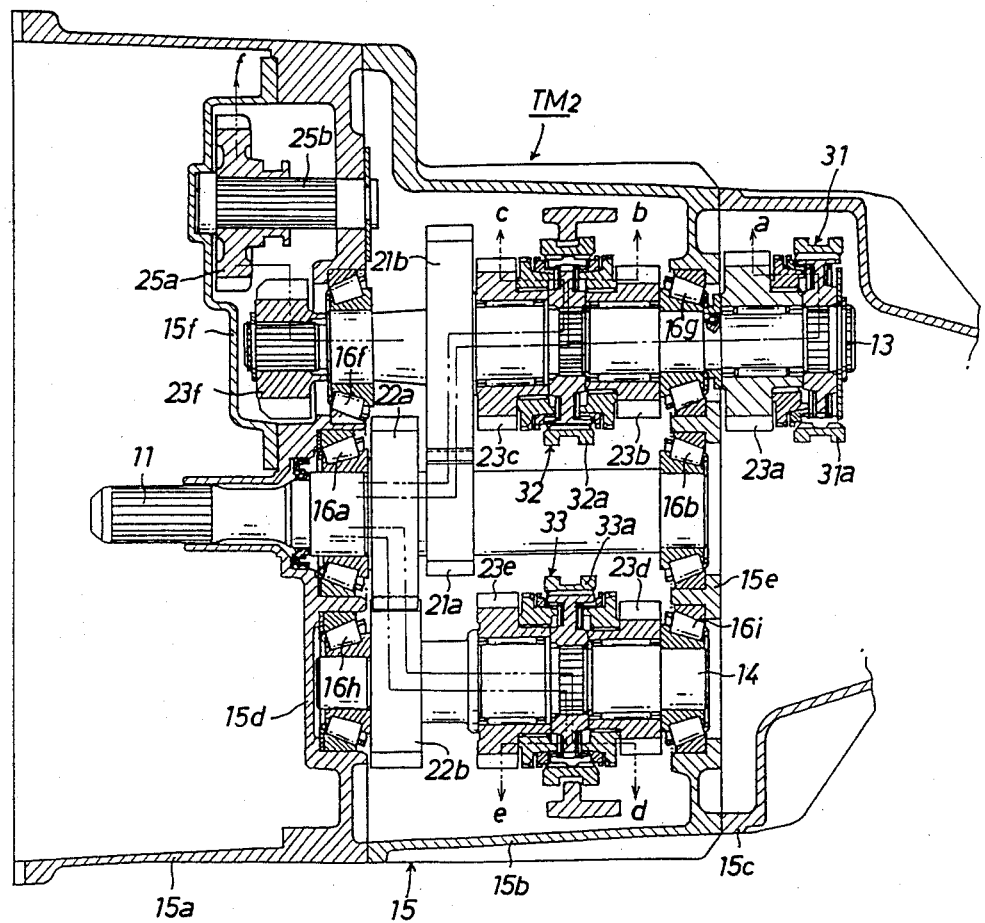
FIG. 7 a sectioned plan view of the second modification which is taken at plane VII—VII in FIG. 8.
Figure 8:
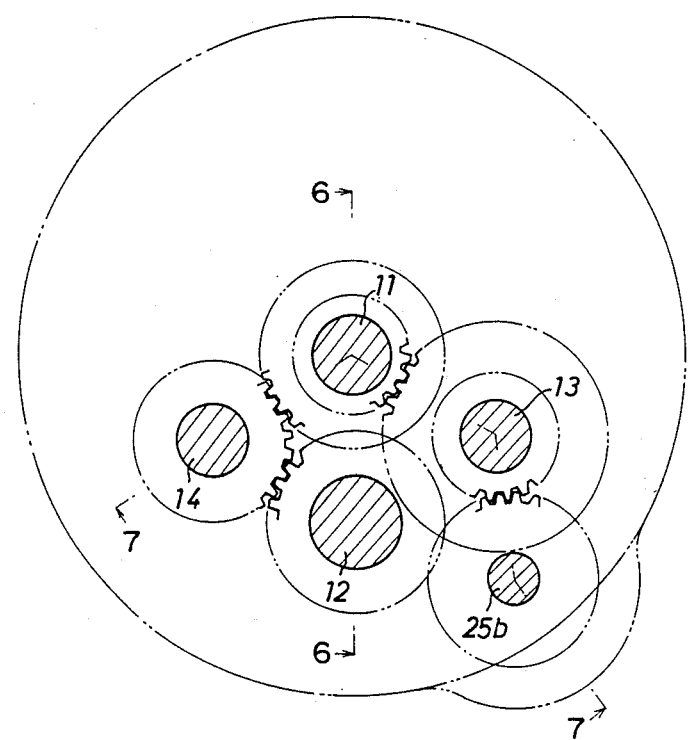
FIG. 8 is a cross-sectional view schematically illustrating an arrangement of four axes in the second modification.

In FIGS. 6-8 there is illustrated a second modification of the manual transmission TM wherein as shown in FIG. 6, the first driven gear 24a is located in the extension housing part 15c for rotation with the output shaft 12, the second and third driven gears 24b and 24c are located in the transmission housing part 15b for rotation with the output shaft 12, and the reverse driven gear 24d is located in the clutch housing part 15a for rotation with the output shaft 12. In the modified transmission TM₂, as shown in FIG. 7, the first forward drive gear 23a is located in the extension housing part 15c and mounted on a rear end portion of first countershaft 13 to be selectively connected to the first countershaft 13 by means of the first synchronizer coupling 31, the second and third forward drive gears 23b and 23c are located in the transmission housing part 15b and mounted on an intermediate portion of first countershaft 13 to be selectively connected to the first countershaft 13 by means of the second synchronizer coupling 32, and the fourth and fifth forward drive gears 23d and 23e are located in the transmission housing part 15b and mounted on an intermediate portion of second countershaft 14 to be selectively connected to the second countershaft 14 by means of the third synchronizer coupling 33.

In the above arrangement, the first forward drive gear 23a is continuously in meshing engagement with the first driven gear 24a on output shaft 12 to establish a first speed drive train when the first synchronizer coupling 31 has been moved to connect the first forward drive gear 23a to the first countershaft 13. The second and fourth forward drive gears 23b and 23d are continuously in meshing engagement with the second driven gear 24b on output shaft 12 to establish a second speed drive train when the second synchronizer coupling 32 has been moved to connect the second forward drive gear 23b to the first countershaft 13 and to establish a fourth speed drive train when the third synchronizer coupling 33 has been moved to connect the fourth forward drive gear 23d to the second countershaft 14. The third and fifth forward drive gears 23c and 23e are continuously in meshing engagement with the third driven gear 24c on output shaft 12 to establish a third speed drive train when the second synchronizer coupling 32 has been moved to connect the third forward drive gear 23c to the first countershaft 13 and to establish a fifth speed drive train when the third synchronizer coupling 33 has been moved to connect the fifth forward drive gear 23e to the second countershaft 14.

In the modified transmission TM₂, the reverse drive gear 23f is mounted on a front end of first countershaft 13 extending into the clutch housing part 15a. A reverse idler gear 25a is axially slidably mounted on an idler shaft 25b which is rotatably carried on the upright rear end wall 15d of clutch housing part 15a and a cover member 15f secured to the same. When shifted rearwards by a shift fork (not shown), the reverse idler gear 25a is brought into meshing engagement with the reverse drive and driven gears 23f and 24d to establish a reverse drive train. The cover member 15f is formed to contain the reverse drive, idler and driven gears 23f, 25a and 24d therein.

As is understood from the above description, the modified transmission TM₂ is characterized in that the first forward drive gear 23a is mounted on the rear end of first countershaft 13 and engaged with the first driven gear 24a in the extension housing part 15c and that the reverse drive gear 23f is mounted on the front end of first countershaft 13 to be engaged with the reverse driven gear 24d through the idler gear 25a in the clutch housing part 15a. With such an arrangement, the first forward drive gear 23a and reverse drive gear 23f can be arranged adjacent the tapered roller bearings 16g and 16f on upright rear end walls 15e and 15d and positioned on the opposite ends of first countershaft 13 to enhance the support rigidity of shafts 12 and 13.

Figure 9:
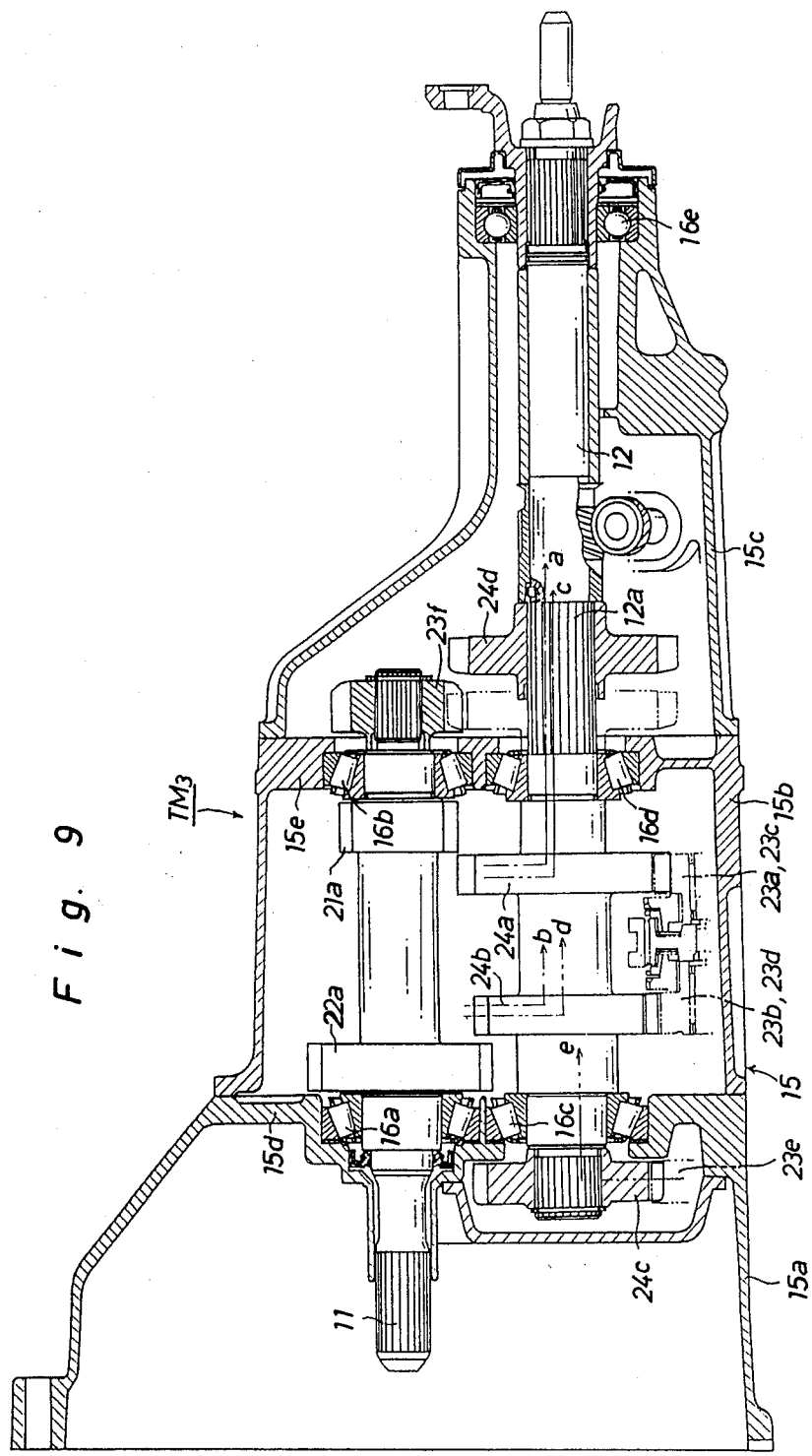
FIG. 9 is a sectioned side view of a third modification of the manual transmission which is taken at plane IX—IX in FIG. 11.
Figure 10:
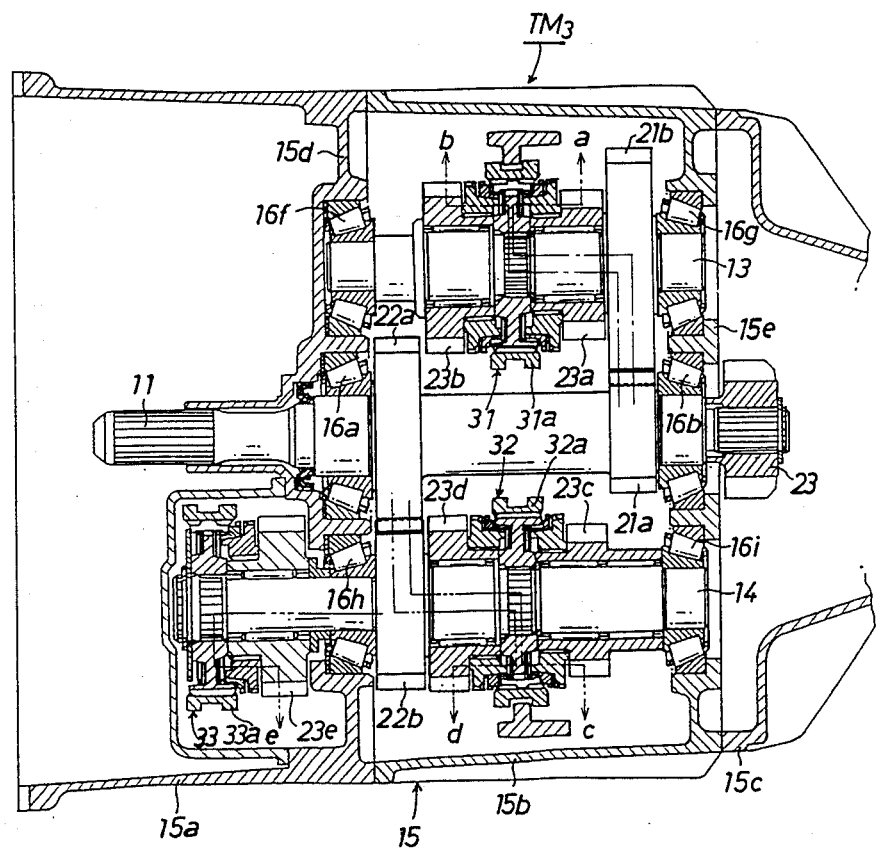
FIG. 10 is a sectioned plan view of the third modification which is taken at plane X—X in FIG. 11.
Figure 11:
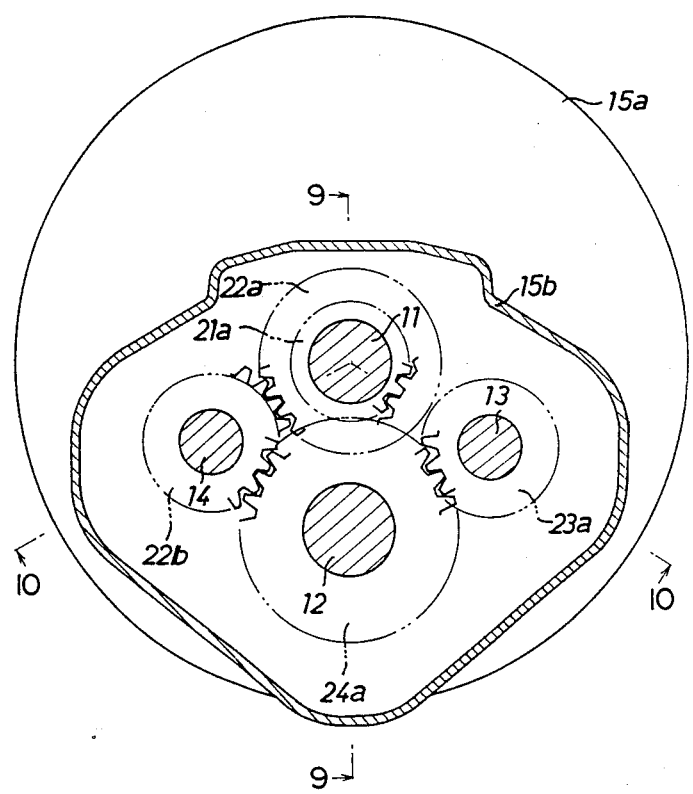
FIG. 11 is a cross-sectional view schematically illustrating an arrangement of four axes in the third modification.

In FIGS. 9-11 there is illustrated a third modification of the manual transmission TM wherein the first drive gear 21a on input shaft 11 is axially spaced from the second drive gear 22a and arranged adjacent the tapered roller bearing 16b on upright rear end wall 15e. In the modified transmission TM₃, the first driven gear 21b on first countershaft 13 is arranged adjacent the tapered roller bearing 16g on upright rear end wall 15e and continuously engaged with the first drive gear 21a, while the second drive gear 22a on input shaft 11 is arranged adjacent the tapered roller bearing 16a on upright rear end wall 15d and continuously engaged with the second driven gear 22b on second countershaft 14. With such an arrangement, both the drive gears 21a and 22a can be efficiently manufactured by a hobbing machine, and the support rigidity of shafts 11, 13 and 14 can be increased to eliminate gear noises caused by axial strain of the shafts.

Figure 12:
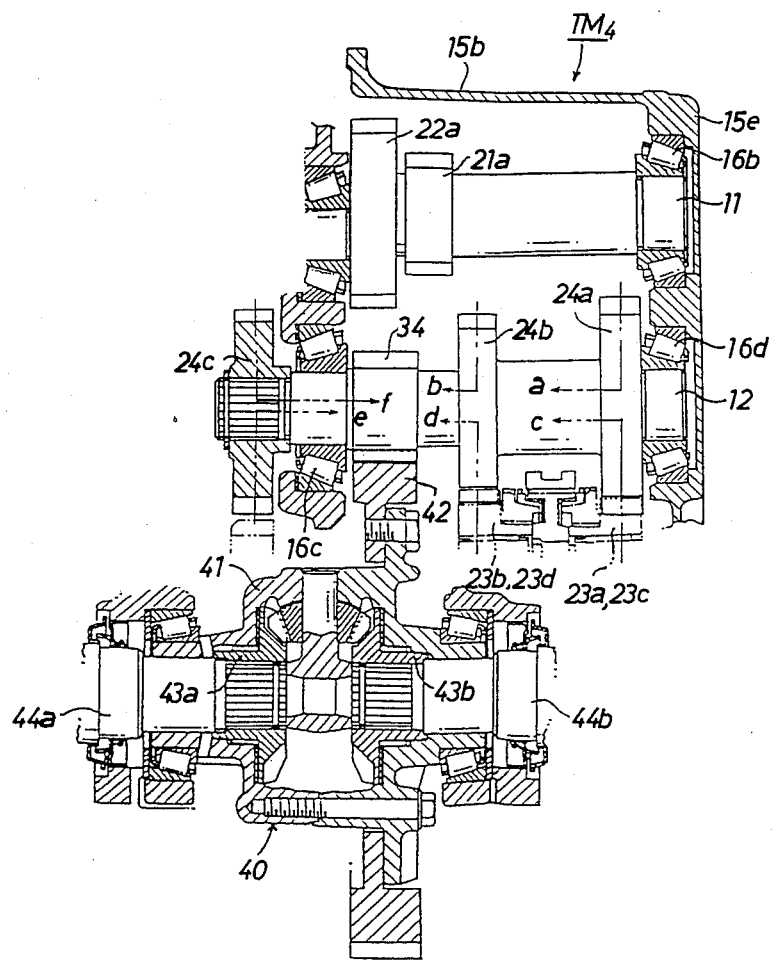
FIG. 12 a sectioned side view of a fourth modification of the manual transmission which is taken at plane XII—XII in FIG. 14.
Figure 13:
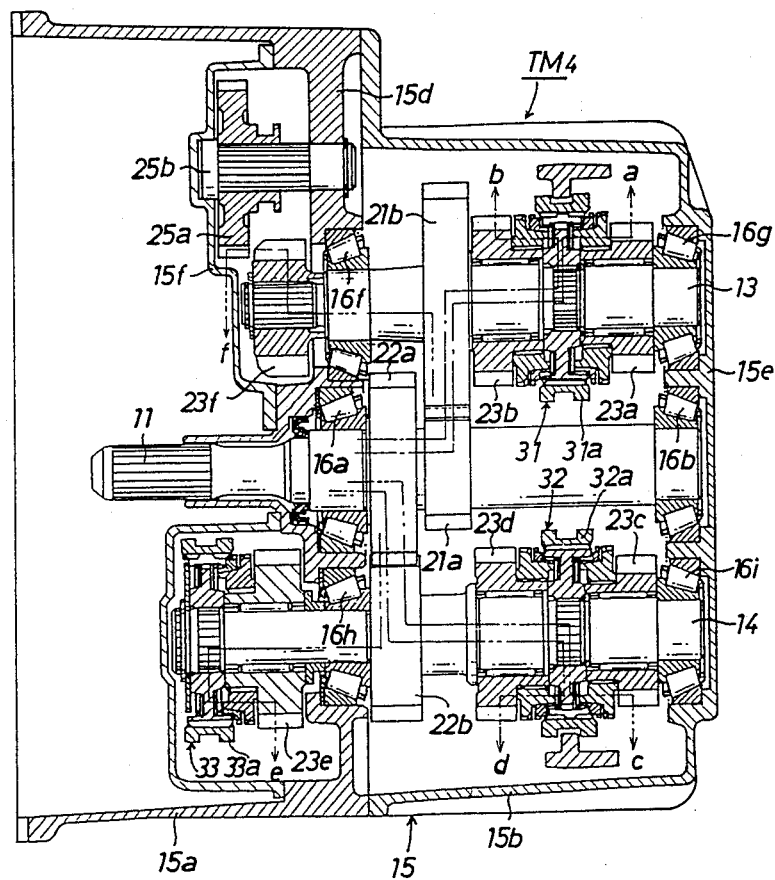
FIG. 13 is a sectioned plan view of the fourth modification which is taken at plane XIII—XIII in FIG. 14.
Figure 14:
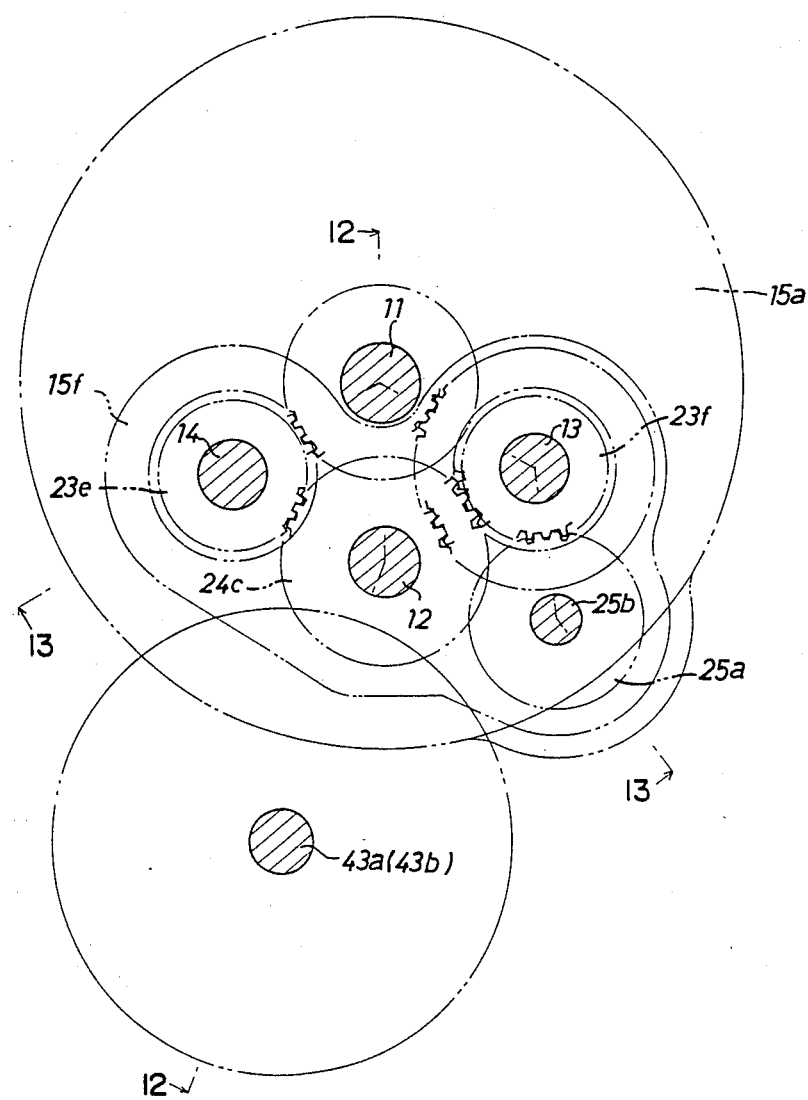
FIG. 14 is a cross-sectional view schematically illustrating an arrangement of four axis in the fourth modification.

In FIGS. 12-14 there is illustrated a fourth modification of the manual transmission TM₁ shown in FIGS. 4 and 5. In the modified transmission TM₄, as shown in FIG. 12, the reverse driven gear 24d is eliminated from the output shaft 12, and as shown in FIG. 13, the reverse drive gear 23f is mounted on a front end of first countershaft 13 extending into the clutch housing part 15a. A reverse idler gear 25a is axially slidably mounted on an idler shaft 25b which is rotatably carried on the upright rear end wall 15d of clutch housing part 15a and a cover member 15f secured to the same. When shifted rearwards by a shift fork (not shown), the reverse idler gear 25a is brought into meshing engagement with the reverse drive gear 23f and the third driven gear 24c on output shaft 12 to establish a reverse drive train. As shown in FIG. 14, the cover member 15f is formed to contain therein the reverse drive and idler gears 23f, 25a, fifth drive gear 23e and third driven gear 24c. The other construction and component parts are substantially the same as those in the manual transmission TM₁ shown in FIGS. 4 and 5. With such an arrangement, the axial length of transmission TM₄ can be shortened since the third driven gear 24c is utilized as a reverse driven gear for drive connection with the reverse drive gear 23f on first countershaft 13.

Figure 15:
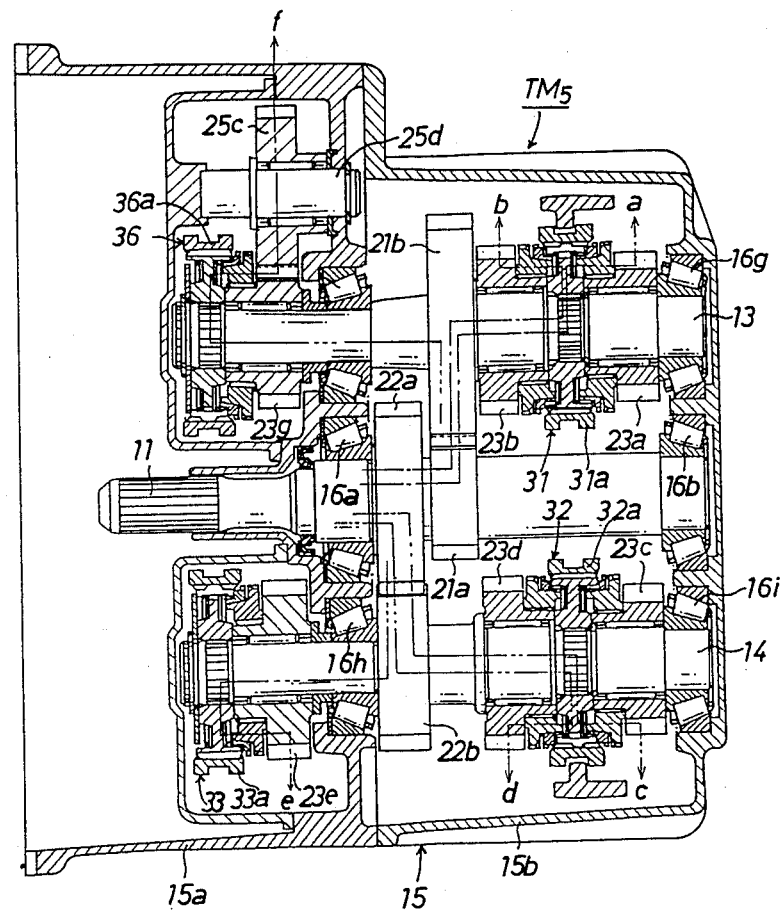
FIG. 15 is a sectioned plan view of a fifth modification of the manual transmission.

In FIG. 15 there is illustrated a fifth modification of the manual transmission TM. In the modified transmission TM₅, the first countershaft 13 has a reverse drive gear 23g rotatably mounted on the front end thereof and a fourth synchronizer coupling 36 adapted to selectively connect the reverse drive gear 23g to the first countershaft 13. A reverse idler gear 25c is rotatably mounted on an idler shaft 25d which is carried on the upright rear end wall 15d of clutch housing part 15a and cover member 15f. The reverse idler gear 25c is continuously in meshing engagement with the reverse drive gear 23g and the third driven gear 24c on output shaft 12. The other construction and component parts are substantially the same as those in the manual transmission TM₄ shown in FIGS. 12-14.

Having now fully set forth the structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that with the scope of the appended claims, the invention may be practiced otherwise than as specifically set forth herein.

What is claimed is:

1. A manual transmission for motor vehicles, comprising:
a housing;
an input shaft rotatably mounted within said housing and having a first drive gear of small diameter for low speed drive and a second drive gear of large diameter for high speed drive fixed thereon;
an output shaft rotatably mounted within said housing in parallel with said input shaft and having at least a pair of axially spaced change-speed driven gears mounted thereon;
a first countershaft rotatably mounted within said housing and arranged in parallel with said input and output shafts at one side thereof, said first countershaft having a first driven gear fixed thereon and continuously engaged with said first drive gear on said input shaft, a pair of axially spaced low speed drive gears rotatably mounted thereon and continuously engaged with the change-speed driven gears on said output shaft, and a first synchronizer coupling provided thereon to selectively connect said low speed drive gears to said first countershaft; and
a second countershaft rotatably mounted within said housing and arranged in parallel with said input and output shafts at the other side thereof, said second countershaft having a second driven gear fixed thereon and continuously engaged with said second drive gear on said input shaft, a pair of axially spaced high speed drive gears rotatably mounted thereon and continuously engaged with the change-speed driven gears on said output shaft, and a second synchronizer coupling provided thereon to selectively connect said high speed drive gears to said second countershaft;
wherein all said drive and driven gears on said input and output shafts and all said driven and drive gears on said countershafts are contained in said housing, and wherein an additional change-speed driven gear is fixed on one end of said output shaft extending into a second housing fastened to one end of said housing, an additional high speed drive gear is rotatably mounted on one end of said second countershaft extending into said second housing and continuously engaged with said additional change-speed driven gear, and a third synchronizer coupling is provided on the one end of said second countershaft to selectively connect said additional drive gear to said second countershaft.

2. A manual transmission as claimed in claim 1, wherein a reverse drive gear is fixed on one end of said first countershaft extending into a third housing fastened to the other end of said housing, and a reverse driven gear is mounted on a portion of said output shaft extending into said third housing to be brought into drive connection with said reverse drive gear.

3. A manual transmission as claimed in claim 1, wherein a reverse drive gear is fixed on one end of said first countershaft extending into said second housing and arranged to be brought into drive connection with said additional driven gear on said output shaft.

4. A manual transmission as claimed in claim 1, wherein a reverse drive gear is rotatably mounted on one end of said first countershaft extending into said second housing and continuously engaged with said additional driven gear on said output shaft through a reverse idler gear, and a fourth synchronizer coupling is provided on the one end of said first countershaft to selectively connect said reverse drive gear to said first countershaft.

5. A manual transmission as claimed in claim 1, wherein said output shaft is a short shaft having an output gear integrally provided thereon and being contained within said first housing at one side of said change-speed driven gears.

6. A manual transmission as claimed in claim 5, wherein said output shaft is continuously in meshing engagement with a ring gear which is fixedly mounted on a differential case of a front differential.

7. A manual transmission for motor vehicles, comprising:
   a transmission housing;
   an input shaft rotatably mounted within said transmission housing and having a first drive gear of small diameter for low speed drive and a second drive gear of large diameter for high speed drive fixed thereon;
   an output shaft rotatably mounted within said transmission housing in parallel with said input shaft;
   a first countershaft rotatably mounted within said transmission housing and arranged in parallel with said input and output shafts at one side thereof, said first countershaft having a first driven gear fixed thereon and continuously engaged with said first drive gear on said input shaft; and
   a second countershaft rotatably mounted within said transmission housing and arranged in parallel with said input and output shafts at the other side thereof, said second countershaft having a second driven gear fixed thereon and continuously engaged with said second drive gear on said input shaft;
   wherein a first change-speed driven gear is fixed on a portion of said output shaft extending into an extension housing fastened to one end of said transmission housing, and second and third change-speed driven gears are fixed on said output shaft within said transmission housing, and wherein a first forward drive gear is rotatably mounted on one end of said first countershaft extending into said extension housing and continuously engaged with said first change-speed driven gear, a first synchronizer coupling is provided on the one end of said first countershaft to selectively connect said first forward drive gear to said first countershaft, second and third forward drive gears are rotatably mounted on said first countershaft within said transmission housing and continuously engaged with said second and third change-speed driven gears, a second synchronizer coupling is provided on said first countershaft to selectively connect said second and third forward drive gears to said first countershaft, fourth and fifth forward drive gears are rotatably mounted on said second countershaft within said transmission housing and continuously engaged with said second and third change-speed driven gears, and a third synchronizer coupling is provided on said second countershaft to selectively connect said fourth and fifth forward drive gears to said second countershaft.

8. A manual transmission as claimed in claim 7, wherein a reverse driven gear is fixed on one end of said output shaft extending into a clutch housing fastened to the other end of said transmission housing, and a reverse drive gear is fixed on the other end of said first countershaft extending into said clutch housing to be brought into drive connection with said reverse driven gear on said output shaft.

9. A manual transmission for motor vehicles, comprising:
   a transmission housing;
   an input shaft rotatably mounted within said transmission housing and having a first drive gear of small diameter for low speed drive and a second drive gear for large diameter for high speed drive fixed thereon, said first drive gear being axially spaced from said second drive gear;
   an output shaft rotatably mounted within said transmission housing in parallel with said input shaft and having at least a pair of axially spaced change-speed driven gears mounted thereon and located between said first and second drive gears on said input shaft;
   a first countershaft rotatably mounted within said transmission housing and arranged in parallel with said input and output shafts at one side thereof, said first countershaft having a first driven gear fixed thereon and continuously engaged with said first drive gear on said input shaft, a pair of axially spaced low speed drive gears rotatably mounted thereon and continuously engaged with the change-speed driven gears on said output shaft, and a first synchronizer coupling provided thereon to selectively connect said low speed drive gears to said first countershaft; and
   a second countershaft rotatably mounted within said transmission housing and arranged in parallel with said input and output shafts at the other side thereof, said second countershaft having a second driven gear fixed thereon and continuously engaged with said second drive gear on said input shaft, a pair of axially spaced high speed drive gears rotatably mounted thereon and continuously engaged with the change-speed driven gears on said output shaft, and a second synchronizer coupling provided thereon to selectively connect said high speed drive gears to said second countershaft.

* * * * *